United States Patent [19]

Elphick et al.

[11] Patent Number: 5,218,539
[45] Date of Patent: Jun. 8, 1993

[54] FORMS PROCESSOR WITH CONTROLLED REMOTE REVISION

[75] Inventors: Simon J. Elphick; Robin M. Wickes, both of Edinburgh, Scotland

[73] Assignee: International Business Machines Corporation, Armonk, N.Y.

[21] Appl. No.: 595,740

[22] Filed: Oct. 10, 1990

Related U.S. Application Data

[63] Continuation of Ser. No. 414,641, Sep. 28, 1989, abandoned, which is a continuation of Ser. No. 936,294, Dec. 1, 1986, abandoned.

[51] Int. Cl.$^5$ ............................................. G06F 15/16
[52] U.S. Cl. ............................ 364/419; 364/DIG. 2; 364/943; 364/943.43; 364/943.44
[58] Field of Search .................... 364/419; 395/600

[56] References Cited

U.S. PATENT DOCUMENTS

| | | | |
|---|---|---|---|
| 4,118,695 | 10/1978 | Ogawa et al. | 395/100 |
| 4,204,206 | 5/1980 | Bakula et al. | 340/721 |
| 4,429,372 | 1/1984 | Berry et al. | 395/149 |
| 4,441,829 | 4/1984 | Hebert, Jr. et al. | 364/419 |
| 4,445,795 | 5/1984 | Levine et al. | 400/63 |
| 4,454,576 | 6/1984 | McInroy et al. | 395/145 |
| 4,507,753 | 3/1985 | McCastill et al. | 395/149 |
| 4,663,615 | 5/1987 | Hernandez et al. | 340/723 |

FOREIGN PATENT DOCUMENTS 0066063 12/1982 European Pat. Off.
0067290 12/1982 European Pat. Off.
0158766 10/1985 European Pat. Off.

OTHER PUBLICATIONS

Introducing the Professional Office System, IBM Publication No. GH20-5601-3, Copyright 1982, 1983.
Method for Creating Annotation Data, IBM Technical Disclosure Bulletin vol. 28 No. 4 Sep. 1985, pp. 1623-1628.

Primary Examiner—Michael R. Fleming
Assistant Examiner—Debra A. Chen
Attorney, Agent, or Firm—Karl O. Hesse

[57] ABSTRACT

The specification teaches a structured text processing system for use by such people as bank tellers and insurance agents who work at computer controlled work stations connected together in a network of computers. A draft document in the form of a work in progress (WIP) document is disclosed. The WIP document allows the system to efficiently transmit drafts of highly controlled documents such as loan applications and customer letters from one computer to another in the network for approval or additional information without losing control of the standard form text. The standard form text originates as a shell document having defined variables, the text values of which are entered by tellers at work station screens having prompt messages defined by a related shell detail data set. The variable text is stored into a variable response data set. The shell text and the data sets are made part of the WIP document and therefore are available at other computers in the network for use in revising the WIP document.

5 Claims, 6 Drawing Sheets

TEXT 'DATE' TEXT 'SUBJECT' TEXT 'NAME' TEXT 'PREV-LTR' TEXT

| VARIABLE NAME | MAX LENGTH | PROMPT MESSAGE | RETRIEVAL PROGRAM | PROTECT? |
|---|---|---|---|---|
| DATE | 10 | TODAYS DATE => | $ DATE | 1 |
| SUBJECT | 40 | SUBJECT OF LTR=> |  | 0 |
| NAME | 50 | NAME TO SENT => |  | 0 |
| PREV-LTR | 10 | DATE OF CUST LTR=> |  | 0 |
| BALANCE | 20 | CUST BAL == > | $ ACCOUNT | 1 |

Fig. 5A

```
-----------------------------------------------------------------------
7000                         MAIN MENU                            4700
-----------------------------------------------------------------------

Choose from the following, then press ENTER.

1  Handle Mail
        2  Send Message
        3  Create Document
        4  File Cabinet
        5  Nicknames
        6  Distribution Lists
        7  Review Outgoing Mail Status Selection ........ ===   ___
-----------------------------------------------------------------------
F1=Help    F2=Quit    F3=       F4=       F5=       F6=Tutorial
F7=        F8=        F9=       F10=      F11=      F12=Exit
-----------------------------------------------------------------------
```

Fig. 5B

```
-----------------------------------------------------------------------
7330              Create Work-In-Progress Document                4700
-----------------------------------------------------------------------
Type or verify the following information, then press ENTER.
        Shell name ...............  ===   Credit-Line
        Merged document ..........  ===   ABC - Credit-Line
           Information ...........  ===   1866301627
           Author ................  ===   Smith
           Class .................  ===   Loan
           Tag ...................  ===   ABC
           Subject ...............  ===   Line of Credit Application for ABC Review variables .............  ===   2      1=Yes      2=No
Paginate .....................  ===   2
Print ........................  ===   2
Commit .......................  ===   2
Send .........................  ===   2
-----------------------------------------------------------------------
F1=Help    F2=Quit    F3=       F4=       F5=       F6=
F7=        F8=        F9=       F10=      F11=      F12=Exit
-----------------------------------------------------------------------
```

Fig. 5c

```
7331                    Review/Revise Variables                  Variable  :::

CMD   PROMPT                          VALUE                                MORE
 _    :::::::::::::::::::::::::::     ::::::::::::::::::::::::::::::::::::   :
 _    :::::::::::::::::::::::::::     ::::::::::::::::::::::::::::::::::::   :
 _    :::::::::::::::::::::::::::     ::::::::::::::::::::::::::::::::::::   :
 _    :::::::::::::::::::::::::::     ::::::::::::::::::::::::::::::::::::   :
 _    :::::::::::::::::::::::::::     ::::::::::::::::::::::::::::::::::::   :
 _    :::::::::::::::::::::::::::     ::::::::::::::::::::::::::::::::::::   :
 _    :::::::::::::::::::::::::::     ::::::::::::::::::::::::::::::::::::   :
 _    :::::::::::::::::::::::::::     ::::::::::::::::::::::::::::::::::::   :
 _    :::::::::::::::::::::::::::     ::::::::::::::::::::::::::::::::::::   :
 _    :::::::::::::::::::::::::::     ::::::::::::::::::::::::::::::::::::   :
 _    :::::::::::::::::::::::::::     ::::::::::::::::::::::::::::::::::::   :
 _    :::::::::::::::::::::::::::     ::::::::::::::::::::::::::::::::::::   :

1 View/Revise

F1=Help      F2=Quit       F3=        F4=       F5=        F6=
F7=Backward  F8=Forward    F9=Top     F10=      F11=       F12=Exit
```

Fig. 5d

```
7100                         Handle Mail                              Page :::

CMD   DESCRIPTION                          TAG       SENDER    DATE
 _    :::::::::::::::::::::::::::::::::   :::::::   :::::::   :::::::
 _    :::::::::::::::::::::::::::::::::   :::::::   :::::::   :::::::
 _    :::::::::::::::::::::::::::::::::   :::::::   :::::::   :::::::
 _    :::::::::::::::::::::::::::::::::   :::::::   :::::::   :::::::
 _    :::::::::::::::::::::::::::::::::   :::::::   :::::::   :::::::
 _    :::::::::::::::::::::::::::::::::   :::::::   :::::::   :::::::
 _    :::::::::::::::::::::::::::::::::   :::::::   :::::::   :::::::
 _    :::::::::::::::::::::::::::::::::   :::::::   :::::::   :::::::
 _    :::::::::::::::::::::::::::::::::   :::::::   :::::::   :::::::
 _    :::::::::::::::::::::::::::::::::   :::::::   :::::::   :::::::
 _    :::::::::::::::::::::::::::::::::   :::::::   :::::::   :::::::
 _    :::::::::::::::::::::::::::::::::   :::::::   :::::::   :::::::

1 View        2 Print       3 Reply      4 Send        5 Change
6 Paginate    7 Commit                   9 Revise F1=Help       F2=Quit       F3=          F4=           F5=         F6=Tutorial
F7=Backward   F8=Forward    F9=Top       F10=Printers  F11=        F12=Exit
```

FORMS PROCESSOR WITH CONTROLLED REMOTE REVISION

This is a continuation of co-pending application, Ser. No. 07/414,641, filed on Sep. 28, 1989, now abandoned, which is itself a continuation of co-pending application Ser. No. 06/936,294, filed on Dec. 1, 1986, now abandoned.

BACKGROUND OF THE INVENTION

1. Field of the Invention

The invention relates generally to the processing of text information and more specifically to the processing of text information as forms being filled out by administrative personnel. More particularly, letters, loan and insurance applications, for example are prepared at the computer work station of a teller or agent serving the public and the prepared item is sent to another work station which may be connected to the same or a different computer in the network for approval by a supervisory person. The system permits the supervisor to revise the variable portions of the document but does not permit change in the text body of the document.

2. Description of the Prior Art

Prior art text processing work stations as well as data processing work stations have permitted an operator to compose documents using standard forms which are then filled in by the operator to create a letter, application or other document. These prior art systems include the Professional Office System program product marketed by IBM Corp. for use on large host computers and the Displaywrite program product marketed by IBM Corp. for use with the IBM Personal Computer. U.S. Pat. Nos. 4,429,372 and 4,454,576 are exemplary of the prior art. The prior art has a disadvantage in that when an operator has finished a document, that document is a homogenous entity discrete from the shell document and data from which it was created. In subsequent revision the entire document including both the fixed and variable text must be handled as a whole for modification. Thus the fixed portion may be changed either willfully or inadvertently by an operator.

Further, the prior art provides no information about the nature of the variable text values that have been merged into the document. Though prompts may have been available to the creator at one computer, they will not be available to the revisor at another computer.

In the IBM Professional Office System, a document can be kept in draft form in the computer on which it was created. When the document is transmitted to another computer, it can only be sent as a committed document and the protection of the structured creation is not available at the other computer. This limitation is caused by the fact that the environment, that is the tables which permit the computer to create the document from the standard form and the variables entered by the user, are only available in the computer in which the document was first created. They are not sent with the document when it is sent to another computer.

There is a need in the finance, insurance and other similar industries, for a computer network text processing system which can make efficient use of the vast amounts of text information already stored in the computer data bases of an organization such as a bank or insurance company. There is also a need in these industries for a text processing system that is relatively structured so as to limit the freedom and flexibility of authors of letters and documents. Such limits are necessary to control the legal obligations of the institutions whose employees create correspondence to customers of the institution. Clearly missing from prior art text processing methods is the ability to forward draft documents to supervisory persons who may be at other remote sites or at the main office to obtain approvals, limits, and other inputs as well as modifications to a draft document in the same structured and controlled manner as the draft document was created.

SUMMARY OF THE INVENTION

The invention provides for draft documents to be electronically sent from one computer to another in a network of computers. This is made possible by sending the draft in the form of a novel work in progress (WIP) document. In one embodiment of the invention, the WIP document is a combination of a shell document with a variable reply data set, and a shell detail data set. In the preferred embodiment, the WIP document is a combination of a merged portion, a variable reply data set, and a shell detail data set. In the following description, the words data set are used in a broad sense to mean a collection or list of information whether stored in memory of a computer or on a magnetic disk.

The merged portion is created in the system of the invention by merging the variable text stored in the variable reply data set into the shell document. The shell document is created only once by the main office and is carefully reviewed to define the legal liabilities of the institution. The shell document is then transmitted to the computers which control the various work stations of tellers or agents and their supervisors. The shell document contains the unchangeable text of a merged portion whereas the variable reply data set contains the text that is permitted to be changed from document to document including items such as name, address, loan limit etc. The system of the invention uses the shell detail data set to display messages prompting the user to enter text for some variables and invokes application programs identified in the shell detail data set to retrieve text for other variables from existing data bases. The variable text entered and retrieved under the system control are stored into the variable reply data set.

When the WIP document is transmitted to a supervisory person, that person uses the same programs of the system of the invention which are made available in the computer at his or her work station. These programs will rarely change except perhaps to correct an error or add another feature. The shell detail data set in contrast must be changed as often as the shell document is changed and such changes can occur between the time that a WIP document is created and when it is modified and approved by a supervisor. For this reason the shell detail data set is made part of the WIP document as it is created. Although the variable text values in the variable reply data set are also in the merged portion of the WIP, they are also made separately available in the WIP document to save the processing time that would be needed to extract them from the merged portion.

The system of the invention uses the WIP document to display to the supervisor, the merged portion for approval. When the supervisor wishes or needs to modify the document, the system uses the shell detail data set and variable reply data set which are also part of the WIP document to display the prompt messages and values of the variables entered by the person who created the WIP document. Where text for a variable has not been entered, only the prompt message is displayed, prompting the supervisor to enter text for the variable. The variable text values entered and or modified by the supervisor are stored into the variable reply data set and the merged portion of the WIP document.

BRIEF DESCRIPTION OF THE DRAWINGS

FIGS. 5A, 5B, 5C, and 5D are detailed screens that are seen by a person using the preferred embodiment of the invention according to FIG. 5.

DESCRIPTION OF THE PREFERRED EMBODIMENT

Figure 1:
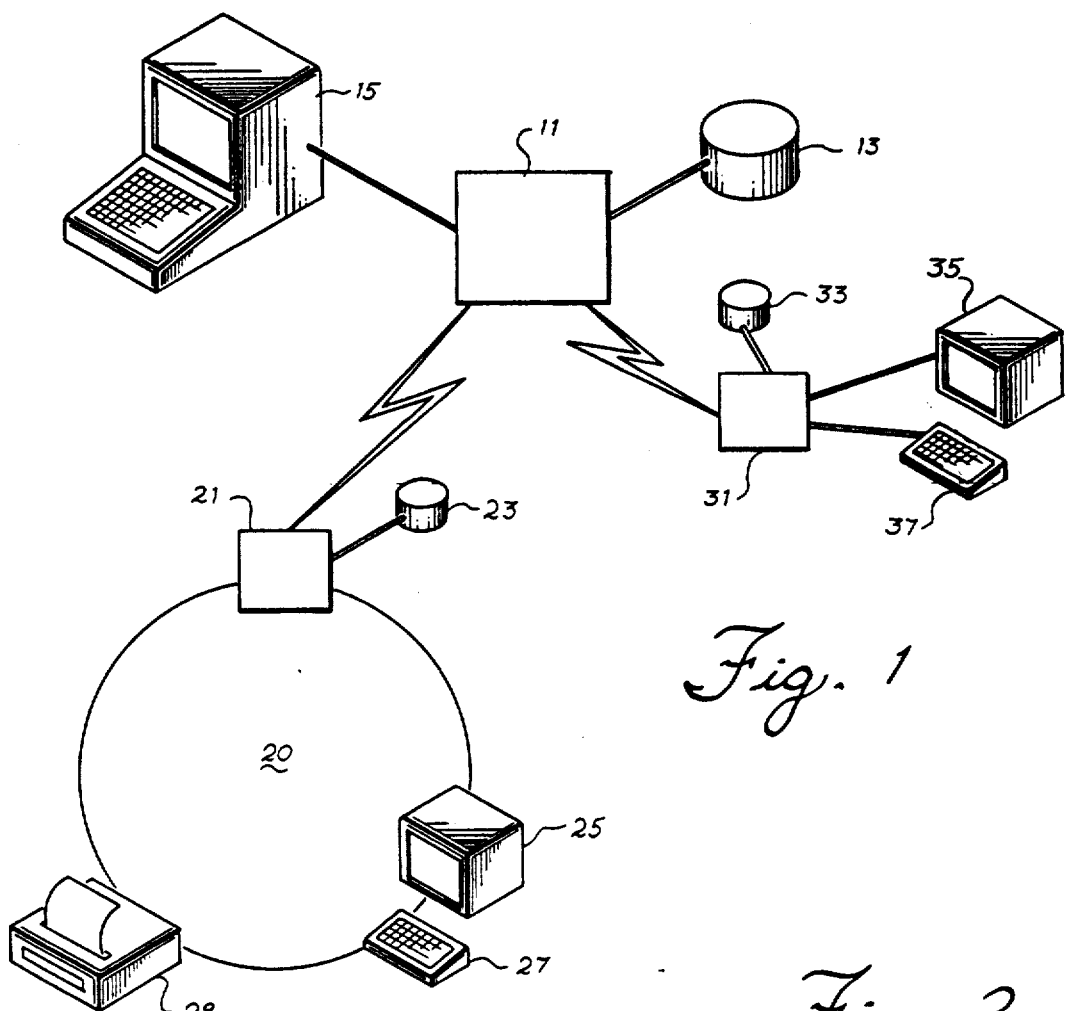
FIG. 1 shows an overview of a network of computers in which the invention finds utility.

Referring to FIG. 1, a block diagram of a multiple computer network is shown. Host computer 11 is supported by direct access storage 13 and a keyboard display terminal 15. Computer 11 is a large computer at a central office of a bank or insurance company and the main data base containing most of the customer information is kept on storage 13 which is preferably a disk storage device. Keyboard display 15 is available for use by supervisory persons such as for example managing loan officers who will be required to review, revise, and approve the loan applications prepared at remote branches of the bank.

Connected remotely to computer 11 by telecommunication lines is a smaller computer 21 having its own direct access disk storage device 23. Computer 21 is either a control computer such as the IBM 4702 used by financial institutions or alternately the processor portion of a personal computer. Connected to computer 21 by a bus is a display station 25, a keyboard 27, and a printer 29. When the computer 21 is a controller, there will be a plurality of keyboards, displays and printers, each sharing the processing services of computer 21. The combination of display 25, keyboard 27, printer 29, and computer 21 constitutes a remote work station as would be used by branch office staff such as a teller or administrative employee at a remote branch bank to prepare draft letters, loans applications and so forth.

Also connected to host computer 11 is a computer 31 shown in FIG. 1 as a personal computer. Computer 31 also has a display 35, a keyboard 37 and a disk 33. Computer 31 is contemplated in this embodiment to be a personal computer having a number of programs including the IBM Displaywrite program.

Figure 2:
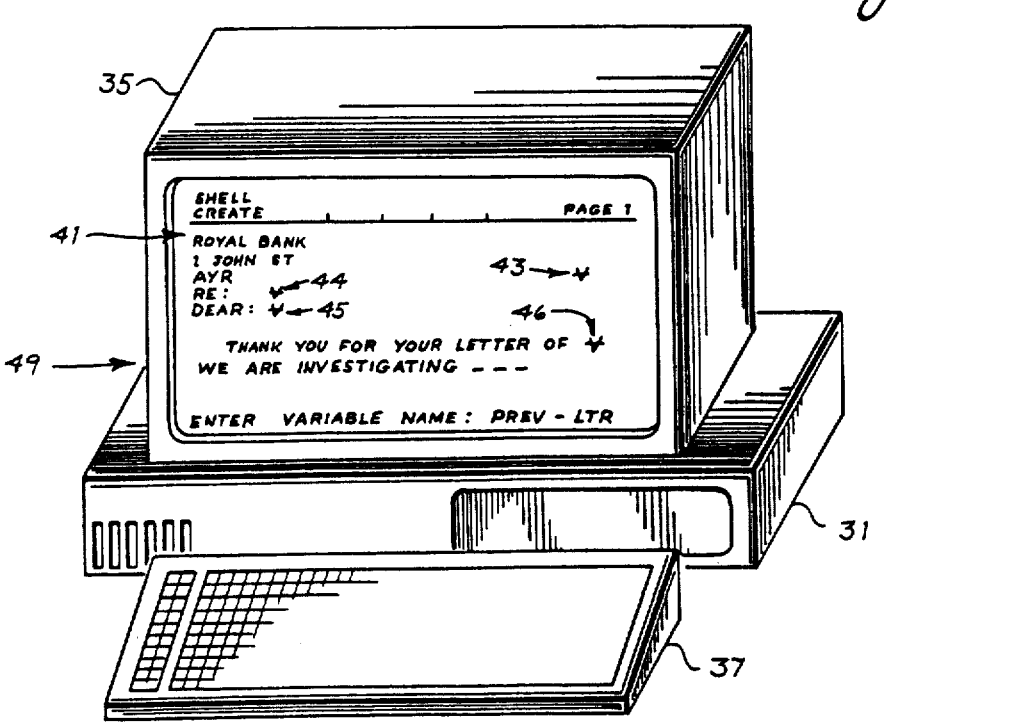
FIG. 2 is a view of the screen of a work station on which the shell document is being created.

FIG. 2 shows the screen of display 35 as computer 31 is being used to generate a shell document. The shell is being created as a .txt document using the IBM Displaywrite program. The .txt document will later be converted to a Document Content Architecture Revisable Form Text (RFTDCA) document as defined in IBM Reference Manual SC23-0758. All of the fixed or unchangeable text 41 of the shell is directly entered as text. Whenever a variable text word or phrase is to be later inserted, the shell author enters a control character 43, 44, 45, or 46 by pressing the INSTR/VARIABLE key. The Displaywrite program then prompts the author to enter a name of the variable as shown at 49. The variable name can have up to 16 characters which are incorporated into the shell document as a structured field. The shell document which has been created in FIG. 2 is converted to an RFTDCA document SC23-0758 which can be sent to another computer such as computer 21 where it is stored on disk 23 as a text string file. The format of the shell document stored on disk 23 is shown in FIG. 4A.

Figures 3, 4A, 4B:
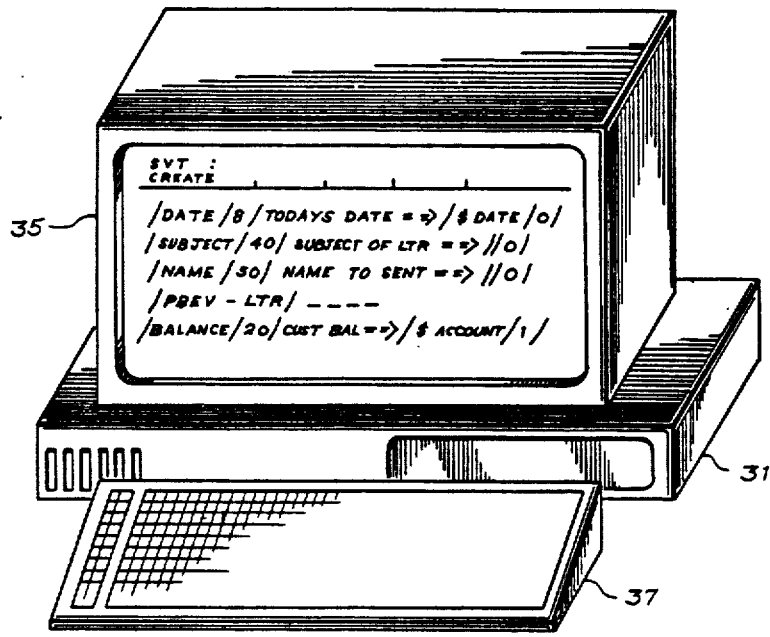
FIG. 3 is a view of the screen of a work station on which the variable table for the shell document is being created.
FIG. 4A shows the format of the shell document 4B, the shell variable table 4C, shell detail data set 4D, the variable reply data set and 4E the WIP document.

FIG. 3 shows the screen of display 35 as computer 31 is being used to generate a shell variable table for the shell document created in FIG. 2. The shell variable table is an easy way for the author of the shell to provide the information which will be stored in the shell detail data set. The shell variable table is also being created using the IBM Displaywrite program. Each line of text being entered by the shell author relates to one variable set up in the shell document. Like the shell document itself, the shell variable table is transmitted to each of the computers such as computer 21 at which structured documents will later be created according to the invention. The format of the shell variable table stored on disk 23 is shown in FIG. 4.

The creation of shell documents and shell variable tables using Displaywrite is done merely for convenience of the author of the shell and is preliminary to the method of the invention but does not constitute a part thereof.

It is also contemplated that for those variables that appear in most documents, a master variable table need only be created once and thereafter, the variable names defined in the master variable table can be used in many shell documents without the need to redefine them for each shell document. Of course if a different prompt message is desired or if it is to be a protected field whereas the variable as defined by the master table is changeable by the teller, then the variable simply is redefined in the shell variable table which takes precedence.

After the shell document and the shell variable table have been transmitted to the computer 21, and stored on disk 23, they are used to generate the shell detail data set which will later be made part of each work in progress (WIP) document created using the shell. A step in creating the shell detail data set is to extract a list of variable names from the shell document. The list is used to access the shell variable table and the master variable table, if one is used, to get the definitions of each variable to create the shell detail data set. In this description, the words data set are used in a broad sense to mean a collection or list of information regardless of where it may be stored.

Referring now to FIG. 4A, the sequence of fixed text and variable names are shown indicating how the string of text and names are stored on disk 23. FIG. 4B shows how the information entered onto the display 35 screen is converted to a shell variable table and stored on disk 23. These format figures are believed to be self explanatory and require very little dissertation except to indicate that the name, maximum length, prompt message, retrieval application program and protect flag are stored for each variable. The retrieval program is that program that will access an existing data base and retrieve such items as the date, a customers account balance and so forth. The protect flag indicates whether the operator can modify the variable text retrieved by the retrieval program, or enter variable text where none has been retrieved. An example is a case where the author of the shell may have decided not to let a teller modify an account balance retrieved by a program from the main data base. In FIG. 4B, a binary 0 is an unprotected variable whereas a binary 1 indicates a protected variable which cannot be changed from the keyboard.

Figure 4C:
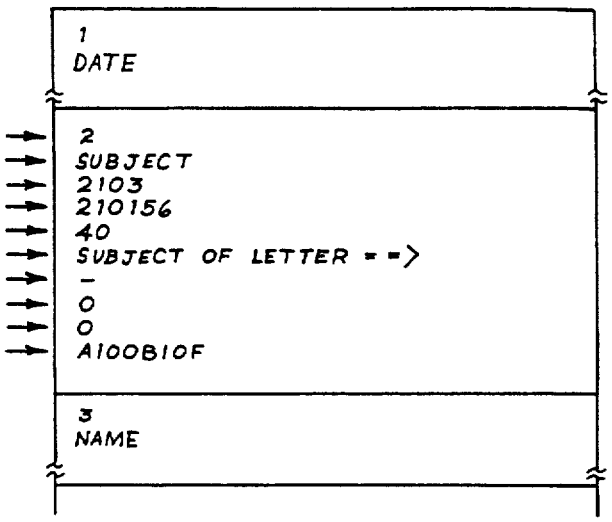

Attention is now drawn to FIG. 4C where the format of the shell detail data set is set forth. The shell detail data set is important to the invention, not in it's specific format but in the fact that it is appended to the shell along with the variable reply data set to create the work in progress (WIP) document of the invention. In this embodiment, the shell detail data set has an entry for each time a variable appears in the shell document and in the same sequence as the variables appear in the shell. Each entry is numbered and the number is the first record of each entry.

Taking for example the second entry which is the 'subject' variable, the name of the variable appears as the second field. The third field is the number of bytes of data preceding the variable in the shell document. The fourth field is the character set ID of the text immediately preceding the variable in the shell document. The fifth field through eighth field are taken directly from the shell variable table. They are maximum length of the variable text, the prompt message to be displayed, the name of the retrieval program, and the protection indicator respectively. The ninth field contains the number of the first entry where this same variable has been used before in the shell document. The use of this field allows the variable to be entered or retrieved only once but placed in the shell document as often as needed. The tenth field provides access to the variable text value, stored separately in the variable reply data set.

Figure 4D:
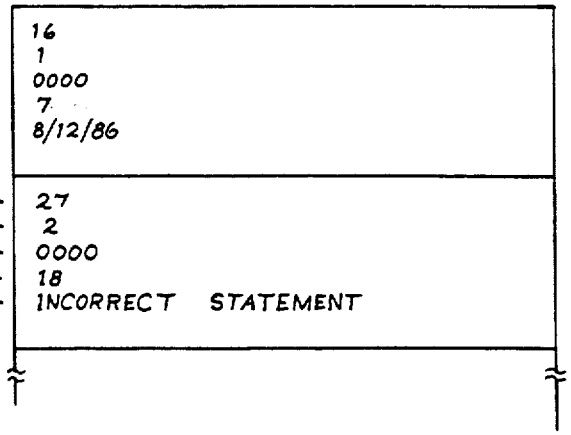

FIG. 4D shows the format of the variable reply data set. Each entry has five fields. The first is the length of the entry expressed as a number of bytes. The second field is the number of the variable to which the entry relates. The third field contains the character set ID number if the character set to be used for the variable text is different from the character set used for the shell document at the point where the variable text is to be inserted. The character set ID allows a variable to appear in the final document in a different font for high lighting and other purposes. Where the character sets are the same, the field contains all zeros. The fourth field contains the length of the actual variable text which has been retrieved by a program or entered by the person creating the WIP document. This is expressed as a number of bytes. There is only one entry in the variable reply data set for each variable for which text has been supplied, no matter how often it appears in the shell. Variables that have not yet been supplied with variable text do not appear in the variable reply data set.

Figure 4E:
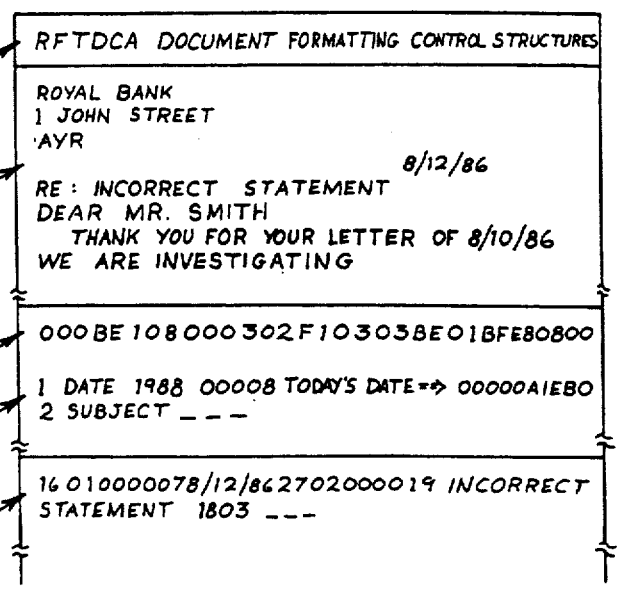

FIG. 4E shows the format of a WIP document implemented in RFTDCA including the position of the non text unit type identifier 000BE108000302F10303BE.

CREATING A WIP DOCUMENT

Figure 5:
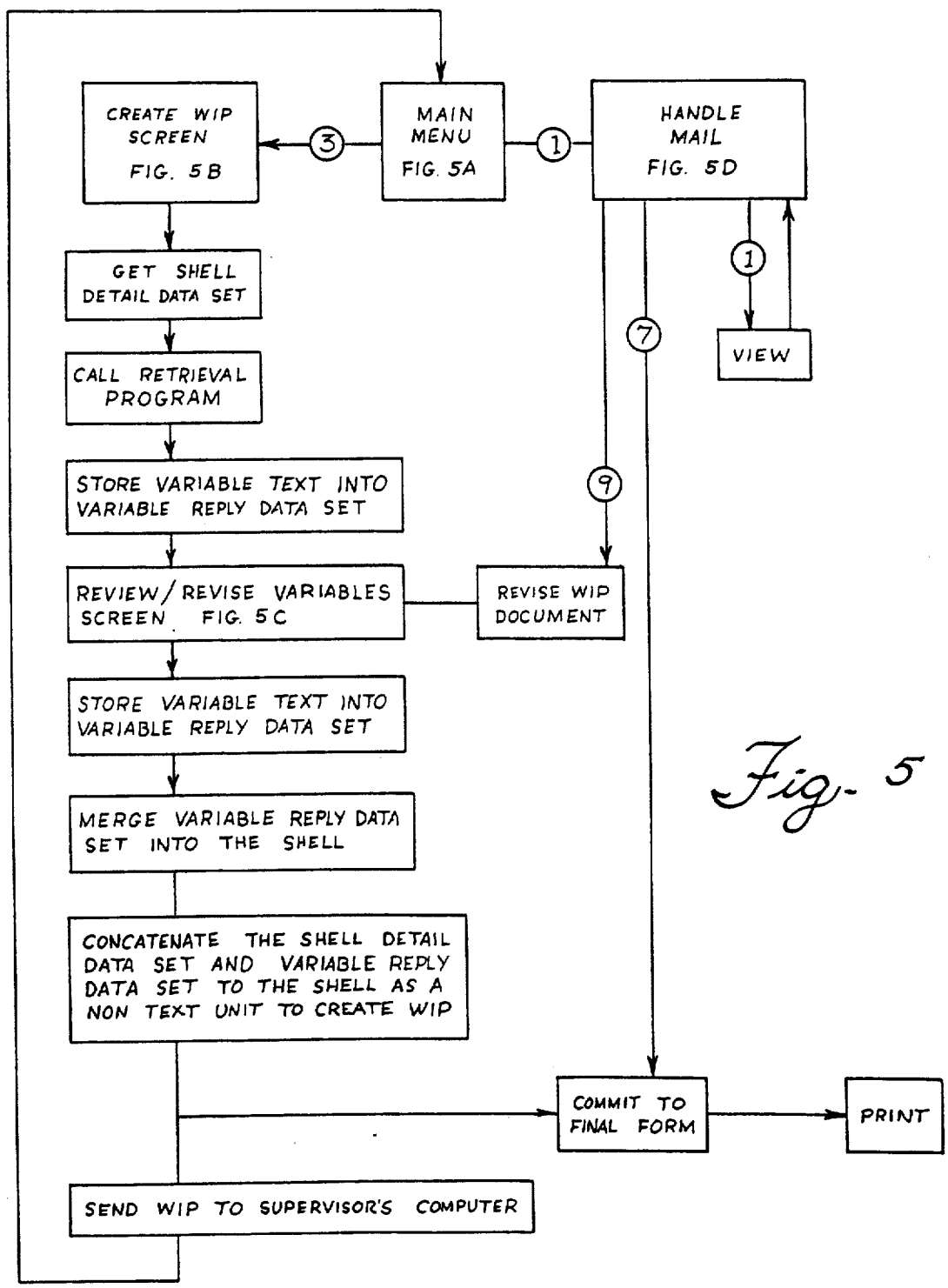
FIG. 5 is the main flow diagram showing how the invention is used by operators and supervisors.

FIG. 5 is a flow diagram showing how branch office staff use the method of the invention on a computer controlled work station to create a work in progress (WIP) document, have it reviewed and possibly revised at a different computer before committing it to final form. The teller for example may wish to prepare a line of credit application for a merchant customer who wants to build up inventory in anticipation of brisk sales. The teller begins at main menu block 51. The actual screen seen by the teller is shown in FIG. 5A. To create a line of credit application, in the form of a WIP document, the teller chooses selection 3 and presses the enter key. That causes the flow to proceed to block 53 which is the screen shown in Figure 5B. The teller then fills in the blanks of the screen starting with the name of the shell document, such as credit-line, and the name of the document being created such as ABC-credit-line if the credit line is being established for the ABC company. The information line is optional and may be used to enter any helpful facts about the WIP document such as the account number of the merchant requesting the line of credit. The remaining lines are the name of the teller preparing the WIP document, class, tag and subject. They provide a means of categorizing documents. At a later time the teller can list all previously created documents that are of a particular class, tag, or subject. For example all documents having a tag of ABC. The remaining selections listed in FIG. 5B are then made, such as to review variables if some are to be entered from the keyboard, by entering the numeral one. The enter key is then pressed to move to block 55.

At block 55 the shell detail data set is read from disk 23 and a retrieval program is called at block 57 if the data is to be retrieved from a data base. The retrieved variable text is placed into the variable reply data set at block 59. The program embodiment of blocks 55 through 59 appear in appendix 1.

The method then proceeds to block 61 where the review/revise screen shown in FIG. 5C is displayed. The program embodiment of block 61 appears in appendix 2. At this time retrieved variable text is displayed. The teller modifies the retrieved text as necessary, if not protected. The teller also key enters variable text for other unprotected variables in the shell if the text is known to the teller. The teller then presses the enter key to move to block 63 where the input variable text is placed in the variable reply data set.

At block 65 in this embodiment, the variable text is merged into the shell document to create the merged portion of the WIP document. The merged portion is that part of the WIP document that can be viewed on a display screen or printed. The flow then moves to block 67 where the WIP document is created by concatenating the shell detail data set and variable reply data set to the merged portion just created. The data sets are concatenated as non text units. The program embodiments of blocks 65 and 67 appear in appendix 3. The program calls a microprogram appearing in appendix 4 in order to provide efficient merging in a reasonable time.

Non text units are structured fields as defined by RFTDCA. Several types of non text units exist in the prior art RFTDCA. The type of non text unit is identified by a value appearing within the structured field as shown in FIG. 4E. A number of valid values and their location in the structured fields are defined in RFTDCA manuals. In order to implement the method of the invention in a network employing RFTDCA, a new value has been defined that uniquely identifies the data sets which constitute the environment of a WIP document. As heretofore described with respect to the preferred embodiment, these are the shell detail data set and the variable reply data set. The content in hexadecimal notation of the structured field prior to the first byte of the first data set is 000BE108000302F10303BExxxx-E80800. The last BE characters in the value uniquely identifies a non text unit of the type used in this embodiment of the invention. Where a second non text unit is required to accommodate the data, the first byte of data in this second non text unit will be preceded by 000BE108000302F20303BExxxxE80800. In both examples, xxxx represents the length in bytes of the data included in the non text unit plus five bytes.

As was discussed earlier, in another embodiment, data sets are concatenated to the shell document to form the WIP. This shortens processing time when the WIP document is created but requires that it be merged at another computer to be reviewed. By sending a merged portion, the supervisor can review the document quickly and may approve without modifying it.

At block 69, the WIP document is transmitted to the computer 11 for review and approval by a loan officer for example. In this example of a line of credit application, the maximum amount of credit to be extended in the line of credit will likely be only determined by a loan officer at the main office and not by branch bank staff.

REVIEWING AND REVISING A WIP DOCUMENT

The loan officer at the main office also starts at block 51 with the main menu of FIG. 5A. The loan officer selects the handle mail option 1. The flow proceeds to block 71 and displays the screen shown in FIG. 5D. The loan officer can select 1 to simply view the WIP document which is accomplished by displaying the merged portion. In our example, the officer selects 9 to revise the variables because the maximum line of credit must be entered by the officer. Selection 9 proceeds to block 73, the program of which appears in appendix 5. From block 73 the flow moves to block 61 in FIG. 5 to allow the officer to see the screen of FIG. 5C.

After entering the maximum credit and reviewing the other variables entered by retrieval program or the teller, the officer presses the enter key to move to block 63. At block 63 the newly entered and revised variable text are stored and flow moves to block 65. At block 65 the new variable text is merged into the merged portion of the WIP document. At block 67 the data sets are concatenated to the merged portion and the reviewed WIP is returned to the teller for final processing.

Final processing involves blocks 51 and 71. In this case the teller may select view function 1 to proceed to block 75 and check that the document is complete and all variable text has been supplied. If the document is satisfactory, the teller exits back to block 71 where selection 7 is made to commit the document at block 77. At block 77 the data sets are disabled.

The creation method of the invention has now been completed and the document can be sent to another computer such as the merchants computer via electronic mail or the document can be printed at block 79 for signature and deposit with the postal services.

As can be seen from the foregoing description of the preferred embodiment, the invention effectively sends the environment of a document being created in draft form along with the document across system boundaries to allow only the variable text of the document to be revised. This is accomplished efficiently by including the variable reply data set and the shell detail data set as non text units concatenated to the merged portion. It will be appreciated by those skilled in the art that such draft documents can be revised without benefit of the invention but such revision is uncontrolled and therefore the bank or other institution is exposed to unpredictable legal liabilities based on the content of such documents. It will also be apparent to those skilled in the art of text processing systems that various changes can be made in the format and content of the data sets that are made part of the work in progress draft documents without departing from the spirit and scope of the invention. For example the variable reply need not be a data set but merely information stored in an area of memory in a defined format as shown in FIG. 4D. When this reply information is to be sent as part of the WIP document, it is merely copied into a non text unit of the WIP document.

```
/***********************************************************************/
/* Forms Processor Pseudo code                                         */
/*                                                                     */
/*                                                      Simon Elphick  */
/*                                                      8/13/85        */
/* MODULE NAME: Subset of DWDF4000                                     */
/*                                                                     */
/*                                                                     */
/* FUNCTION: Create Work in Process Document                           */
/*                                                                     */
/*                          .                                          */
/* DESCRIPTION:                                                        */
/*                                                                     */
/*          This is module calls all the modules which create          */
/*     a Work in Progress document. It calls the user application, if  */
/*     one exists, to obtain Variable text to be merged with the Shell,*/
/*     checks any text that is passed back, calls a module to build and*/
/*     display the text, and then invokes the merge function.          */
/*                                                                     */
/***********************************************************************/

FPCA_SHELL_VARS = "number of Vars in Shell";
                                   /* The # of Variables in the    */
                                   /* Shell are held in the 9th    */
                                   /* and 10th bytes of the        */
                                   /* Info. field of the File      */
                                   /* Cabinet record.              */
```

```
IF (70) IF FPCA_SHELL_VARS > 0
  THEN
  DO;
                                          /* There are Variables in the  */
                                          /* document.                   */

Get a 1024 byte area to read SDD records into;

DO DO while all SDD records have not been processed;
      READ next Shell Detail dataset record;
                                          /* Loop reading SDD records until */
                                          /* they've all been read.         */

IF (90) IF USERAP exists
      THEN
      DO;
        Set up the calling structure with:;
          - Return code - action byte    = nulls;
          - # of Vars/text supplied      = nulls;
          - WIP Document Name            = FPCA_WIP_NAME;
          - Shell Name                   = FPCA_SHELL_NAME;
          - Information Field            = FPCA_INFORMATION;
          - Variable Reply area pointer  = FPCA_VAR_REPLY_PTR;
          - Variable Reply area size     = FPCA_VAR_REPLY_SIZE;

CALL USERAP - get Variable text;
                                          /* On return action byte       */
                                          /*   could be set by USERAP to:*/
                                          /*                             */
                                          /*   1. Allow Review Variables */
                                          /*   2. Don't Allow Rev. Vars  */
                                          /*   3. Cancel the document    */
                                          /*                             */

CASE (10, 30, 30, 30)
      ( action byte set by user ap )
        NAMES ( Set to 1, Set to 2, Set to 3, Other );

SUBCASE;

ENDSUB;
      SUBCASE;
        IF (90) IF FPCA_REVIEW_VARS = YES
          THEN
          DO;
            FPCA_REVIEW_VARS = NO;
            FPCA_REVIEW_VARS_CANCELLED = YES;
          END;
      ENDSUB;

SUBCASE;
        FPCA_RETURN = CANCEL_DOCUMENT;
        RETURN to DWDF5000;
      ENDSUB;

SUBCASE;
                                          /* Log the error.              */
        SET FPCA_RETURN to 6;
        SET FPCA_STATUS to action byte;
        CALL ERROR_MOD - invalid return value from USERAP;
                                          /* Log the fact that a bad     */
                                          /* value has been returned     */
      ENDSUB;
    ENDCASE;
```

```
VARS_TO_PROCESS = # vars/text supplied;
                              /* Set up counter of the number*/
                              /*  of Variables in the Var    */
                              /*  Reply area to process.     */
IF (90) IF VARS_TO_PROCESS > 0
  THEN
  DO;
                              /* Text has been supplied      */
                              /*  so we want to go through   */
                              /*  the Shell Detail dataset   */
                              /*  area, and put pointers in  */
                              /*  the entries of Variables   */
                              /*  for which text has been    */
                              /*  supplied to the            */
                              /*  text itself in the Variable*/
                              /*  Reply area.                */
     Type-cast VAR_TEXT structure at the
        start of the Variable Reply area;

/* Text should be enclosed in  */
                              /*  the VAR_TEXT structures.   */
                              /* Overlay structure so we can */
                              /*  address fields.            */

Type cast the SDD_STRUCT at FPCA_SHELL_DET_PTR;
                              /* FPCA_SHELL_DET_PTR points to*/
                              /*  the start of the area into */
                              /*  which the Shell Detail     */
                              /*  dataset was read. Overlay  */
                              /*  it's structure.            */

VAR_REPLY_PTR = FPCA_VAR_REPLY_PTR;
                              /* Set the current definition  */
                              /*  pointer to the start of    */
                              /*  the area.                  */

/* Loop through the supplied   */
                              /*  text and update the SDD    */
                              /*  area                       */
     SDD_ENTRY_NUM = 1;
                              /* Counter within the Shell    */
                              /*  Detail dataset area        */
     DO DO WHILE VARS_TO_PROCESS > 0;
                              /* Loop while there are Var.   */
                              /*  Text structures in the Var.*/
                              /*  reply area that we haven't */
                              /*  looked at.                 */
                              /* We are going to take each   */
                              /*  entry in the Var Reply     */
                              /*  area, and then loop thru   */
                              /*  the Shell Detail dataset   */
                              /*  looking for an entry for   */
                              /*  the same Variable #.       */

STARTED_LOOKING = SDD_ENTRY_NUM;
                              /* Before we start looping     */
                              /*  record where we started -  */
                              /*  stop here if no match      */
                              /*  found.                     */

DO DO WHILE DO_LOOP = YES;
```

```
    IF IF Variable number of the
        current Variable Reply structure =
            Variable number of the current Shell
                Detail dataset area entry THEN
        DO;
           "Pointer to text structure" field of the current SDD area entry =  VAR_REPLY_PTR;
           DO_LOOP = NO;
                         /* If the Variable number of   */
                         /*  the current SDD area entry */
                         /*  is the same as that of the */
                         /*  current Var Reply area     */
                         /*  entry, then update the SDD */
                         /*  entry with a pointer to    */
                         /*  this text - the text for   */
                         /*  the Variable it defines    */
        END;
    ELSE
        DO;
          Increment SDD_ENTRY_PTR to point to next
            structure;
                         /* Variable numbers didn't     */
                         /*  match - continue looking   */
                         /*  at SDD entries.            */

SDD_ENTRY_NUM = SDD_ENTRY_NUM + 1;
          IF (8C) IF SDD_ENTRY_NUM > FPCA_SHELL_VARS
             THEN
             DO;
                         /* If the current SDD entry    */
                         /* number is greater than the  */
                         /* total number of entries,    */
                         /* reset counter & pointer.    */
                SDD_ENTRY_NUM = 1;
                SDD_ENTRY_PTR = FPCA_SHELL_DET_PTR;
             END;
          IF (9C) IF SDD_ENTRY_NUM = STARTED_LOOKING
             THEN
             DO;
                         /* If we have got back to the  */
                         /*  start without finding a    */
                         /*  match break the loop. This */
                         /*  is an error - the user ap  */
                         /*  has either provided text   */
                         /*  for a Variable number it   */
                         /*  hasn't been asked for, or  */
                         /*  something has become       */
                         /*  corrupted.                 */
                         /* Log the error & continue.   */
                DO_LOOP = NO;
                SET FPCA_RETURN to 7;
                SET FPCA_STATUS to Var Reply entry
                    Variable number;
                CALL ERROR_MOD - invalid Variable number
                         returned by USERAP;
             END;
        END;           /* endelse: var #s don't match */
END;                   /* endwhile: do_loop = yes     */

VARS_TO_PROCESS = VARS_TO_PROCESS - 1;
                         /* Decrement the number of    */
```

```
                                        /* Variables in the Var Reply */
                                        /* area stil to be processed. */

Increment VAR_REPLY_PTR to point to the next Variable
                text structure;
                                        /* Set pointer to next entry  */
                END;                    /* end dowhile: vars2proc = yes*/
            END;                        /* end: vars to process > 0    */
        END;                            /* end: if user ap exists      */
    END;                                /* end: if FPCA_SHELL_VARS > 0 */
ELSE
    DO;
                                        /* There were no variables in  */
                                        /* the shell - a WIP document  */
                                        /* will merely be a copy of    */
                                        /* the shell - copy it.        */

OPEN FPCA_SHELL_DOC dataset;

CALL GENDSN - generate a unique dataset name;

CALL fm_define - DEFINE a dataset with the generated name,
        dataset size = FPCA_SHELL_SIZE, no addtl. extents,
        record length = 1024, no related datasets, use count 1,
        tag = FPCA_TAG, drivecat = 2;

Copy the Shell, record by record to the new dataset;

CLOSE FPCA_SHELL_DOC dataset;

Update File Cabinet record for the FPCA_WIP_DOC file:;
        DIA document name = FPCA_SHELL_NAME;
        Flag byte = 00000100;
        DIA document type = X'0003' - RFTDCA;

Update File Directory file record for the FPCA_WIP_DOC file:;
        DIA document name = FPCA_SHELL_NAME;

CALL Logging - Create WIP Document;

FPCA_RETURN = OK;
    RETURN to DWDF5000;
    END;                                /* endelse: FPCA_SHELL_VARS = 0*/
END;                                    /* end: if reinvocation = yes  */

IF (60) IF FPCA_REVIEW_VARS = YES
    THEN
    DO;
                                        /* If the user chose to Review */
                                        /* and/or supply the Variable  */
                                        /* text, and this was not      */
                                        /* overridden by the user ap,  */
                                        /* call the module to build    */
                                        /* and display the screens.    */
    CALL DWDF4100 - Review the Variables;

/* Pass pointer to the FPCA    */
                                        /* Possible returns:           */
                                        /*   ERROR_DETECTED            */
                                        /*   CREATE_DOCUMENT           */
                                        /*   CANCEL_DOCUMENT           */
                                        /*   PASSTHRU                  */
    IF (30) IF FPCA_RETURN = Create
        THEN
        DO;
```

```
              FPCA_RETURN set by DWDF4100 says Create the document;
         END;
      ELSE
         DO;
            RETURN to DWDF5000;
                                      /* For any other return from   */
                                      /* DWDF4100 we leave FPCA_     */
                                      /* RETURN set as it is and     */
                                      /* return to DWDF5000.         */
         END;
      END;                            /* end: review vars = yes      */

CALL DWDF4200 - Merge Shell and Variable text
        - pass ptr to parameters;

RETURN to DWDF5000;
                                      /* Finished processing - retrn.*/
                                      /* DWDF5000 will process the   */
                                      /* return from DWDF4200.       */
END;

/*****************************************************************/
/* Forms Processor Pseudo code                                   */
/*                                                  Simon Elphick */
/*                                                       1/29/86  */
/* MODULE NAME: Subset of DWDF4100                               */
/*                                                                */
/* FUNCTION: Display Variable Text for Review                    */
/*                                                                */
/* DESCRIPTION:                                                  */
/*                                                                */
/*      This module uses the WIP_Detail array to build Review    */
/*  Variable Screens for the user to modify or supply Variable Text. */
/*                                                                */
/*****************************************************************/
   DO (90) DO WHILE DISPLAY_SCREEN = YES;
                                      /*   Enter loop to build       */
                                      /*   and display the           */
                                      /*   Review/Revise Vars.       */
                                      /*   screens until the         */
                                      /*   user selects a            */
                                      /*   Quit or a Process         */
                                      /*   PF key, or an error       */
                                      /*   occurs.                   */
      IF IF SCREEN_NUMBER = 1
        THEN
         DO;
            MOVE SCREEN_HDR to BUFF_PTR_NOW;
                                      /*   First screen, move the    */
                                      /*   screen header into the    */
                                      /*   buffer. Buffer set up     */
                                      /*   by DWDF5000.              */
            ADD length of SCREEN_HDR to BUFF_PTR_NOW;
            FIELD_NUMBER = 3;
            CURRENT_ATTRIB = PROT;
         END;
      ELSE
         DO;
                                      /*   Clear array associating   */
                                      /*   field sequence numbers    */
                                      /*   with Variable numbers.    */
            Re-initialise SEQUENCE_NUMBER elements to 0;
         END;
```

```
IF IF DISPLAY_INFO = YES
  THEN
    DO;
      MOVE INFO_AREA to BUFF_PTR_NOW;
      ADD length of INFO_AREA to BUFF_PTR_NOW;
                                        /*   Display doc info           */
                                        /*     at the top of the        */
                                        /*     screen.                  */
      FIELD_NUMBER = 4;                 /*                              */
      LINES_LEFT = 12;                  /*   Remaining lines for        */
                                        /*     Prompts & Var. Text.     */
      MOVE X'25250D' TO BUFF_PTR_NOW;   /*   Line feed, Line Feed,      */
                                        /*     Carrier return -         */
                                        /*     cursor at ln 9, pos 1    */
      INCREMENT BUFF_PTR_NOW by 3 bytes;
      INFO_DISPLAYED = YES;
      CURRENT_ATTRIB = PROT;
    END;
  ELSE
    DO;
      LINES_LEFT = 17;                  /*   No doc info - more lines   */
      INFO_DISPLAYED = NO;
    END;
DO DO WHILE MAKING_SCREEN = YES;
                                        /*   Loop building screen       */
                                        /*     lines until the          */
                                        /*     screen is full.          */
                                        /*   Then add the Screen        */
                                        /*     Tail and exit.           */

IF (90) IF DUPLICATE ( of struct pointed to by VAR_DEF_PTR ) NE 0
    THEN
    DO;

IF IF TEXT_LEN ( of struct pointed to by VAR_DEF_PTR ) = 0
      THEN
      DO;
        Check Variable definition:;
                                        /*   If no text has been        */
                                        /*   supplied, check whether    */
                                        /*   a maximum length has been  */
                                        /*   supplied in an SVT or MVT  */

IF IF MAX_LEN ( of struct pointed to by VAR_DEF_PTR )- 38 > 0
          THEN
          DO;
            LINES_REQUIRED = 1+-(((MAX_LEN - 38 ) / 80 ) rounded up);
                                        /*   Max len. supplied. Calc    */
                                        /*     lines required.          */
          END;
        ELSE
          DO;
            LINES_REQUIRED = 1;
          END;
      END;
    ELSE
      DO;
        IF IF VARIABLE_NUMBER ( of struct pointed to by VAR_DEF_PTR )
              = EXPAND_VAR
        THEN
        DO;
          LINES_REQUIRED = 1+ ((( MAX_LEN - 38 ) / 80 ) rounded up);
        END;
        ELSE
        DO;
```

```
            LINES_REQUIRED = 1+ ((( TEXT_LEN - 36 ) / 30 ) rounded up);
         END;

END;
END;                              /* If duplicate not 0              */

IF (83) IF LINES_REQUIRED < LINES_LEFT
   THEN
   DO;
      MOVE PROT_ATTRIB to BUFF_PTR_NOW;
      INCREMEMENT BUFF_PTR_NOW by 3 bytes;
      INCREMENT FIELD_NUMBER;
                                  /*                                 */
      IF IF PROMPT
             ( of VAR_DEF structure pointed to by VAR_DEF_PTR )
                 is nulls
         THEN
         DO;
            MOVE NLS_PROMPT to BUFF_PTR_NOW;
            ADD length of ( NLS_PROMPT ) to BUFF_PTR_NOW;
            MOVE VAR_NAME
                  ( of VAR_DEF structure pointed to by VAR_DEF_PTR )
                     to BUFF_PTR_NOW;
            INCREMEMENT BUFF_PTR_NOW by 16 bytes;
         END;
         ELSE
         DO;
            MOVE PROMPT
                 ( of VAR_DEF structure pointed to by VAR_DEF_PTR )
                     to BUFF_PTR_NOW;
            ADD length of ( PROMPT ) to BUFF_PTR_NOW;
         END;

IF IF DUPLICATE = 0
      THEN
      DO;
         MOVE  X'34002E' to BUFF_PTR_NOW;
         INCREMEMENT BUFF_PTR_NOW by 3 bytes;
         IF IF PROTECTED
               ( of VAR_DEF structure pointed to by VAR_DEF_PTR )
                  = 1
                                        /*   Field should be         */
                                        /*     unprotected.          */
            THEN
            DO;
               MOVE UNPROT_HI_ATTRIB to BUFF_PTR_NOW;
                                        /*  Attribute: unprotected   */
               INCREMEMENT BUFF_PTR_NOW by 3 bytes;
               INCREMENT FIELD_NUMBER;
               VAR_FIELD_NUMBER
                   ( of VAR_DEF structure pointed to by VAR_DEF_PTR )
                       = FIELD_NUMBER;
            END;

IF (60) IF TEXT_PTR
               ( of VAR_DEF structure pointed to by VAR_DEF_PTR )
                   is not nulls
            THEN
            DO;
               IF (90) IF GCID field of Variable Reply structure pointed
                     to by the TEXT_PTR field of
                        VAR_DEF structure pointed to by VAR_DEF_PTR
                           is not code page 37
                  THEN
                  DO;
```

```
IF (90) IF GCID field is nulls
THEN
DO;
   Set GCID field to 37;
END;
ELSE
DO;
                 /* else: gcid field is nulls         */

IF (60) IF a translation table exists for the
         conversion from the text GCID to code page 37
      THEN
      DO;
         DATA ACCESS the translation table;
         DO DO until end of text;
            translate character to code page 37;
         END;
         Change GCID of the Variable Reply structure to
            code page 37;
      END;
   END;              /* end: gcid not nulls           */
   END;              /* End: text GCID not 37         */
MOVE TEXT
   ( of VAR_REPLY structure pointed to by TEXT_PTR
     of Variable Definition pointed to by VAR_DEF_PTR )
         to BUFF_PTR_NOW;
ADD TEXT_LEN
   ( of VAR_DEF structure pointed to by VAR_DEF_PTR )
         to BUFF_PTR_NOW;
IF (90) IF EXPAND_VAR = VARIABLE_NUMBER
   THEN
   DO;
      IF (90) IF TEXT_LEN < MAX_LEN ( for the Variable )
         THEN
         DO;
            MOVE ( MAX_LEN - TEXT_LEN ) nulls to the
               BUFF_PTR_NOW;
            ADD ( MAX_LEN - TEXT_LEN ) to BUFF_PTR_NOW;
            EXPAND_VAR = 0;
         END;
   END;

END;              /* end: if duplicate = 0            */
ELSE
DO;
   MOVE NLS_SAME_AS to BUFF_PTR_NOW;
   ADD length of NLS_SAME_AS to BUFF_PTR_NOW;
   MOVE DUPLICATE to BUFF_PTR_NOW;

ADD 2 to BUFF_PTR_NOW;
   END;

IF IF CURRENT_ATTRIB = UNPROT_HI
      THEN
      DO;
         MOVE PROT_ATTRIB to BUFF_PTR_NOW;
         INCREMENT BUFF_PTR_NOW by 3 bytes;
         INCREMENT FIELD_NUMBER;

IF IF TEXT_LEN
            ( of VAR_DEF structure pointed to by VAR_DEF_PTR )
               is not equal to 38
            THEN
            DO;
```

```
                MOVE X'250D' TO BUFF_PTR_NOW;
                                /*   Line feed, Carrier Rtn     */
                                /*     cursor:next ln, pos 1    */
                INCREMEMENT BUFF_PTR_NOW by 2 bytes;
             END;               /* end:textlen npt 30           */
          END;                  /* end:currt.attrib hi - unpro  */
       END;                     /*   end: if text length not 0  */
    ELSE
       DO;
          IF (90) IF MAX_LEN
                ( of struct pointed to by VAR_DEF_PTR )
                    is greater than 0
             THEN
             DO;
                IF (90) IF CURRENT_ATTRIB = UNPROT_HI
                   THEN
                   DO;
                      MOVE Line Feed and Carrier Rtn controls
                         to BUFF_PTR_NOW for
                         ( LINES_REQUIRED - 1 ) times;
                      INCREMEMENT BUFF_PTR_NOW by 2 bytes x
                         ( LINES_REQUIRED - 1 );
                      IF IF MAX_LEN
                            ( of struct pointed to by VAR_DEF_PTR )
                                does not exactly fill a whole number of
                                lines ( eg. 30 characters on the first
                                line and 80 on any subsequent lines)
                         THEN
                         DO;
                                        /*   Move the cursor to the   */
                                        /*     end of the last        */
                                        /*     partial line of the    */
                                        /*     field.                 */
                            MOVE X'3408' to BUFF_PTR_NOW;
                                        /*   Performing relative      */
                                        /*     horizontal move.       */
                            INCREMEMENT BUFF_PTR_NOW by 2 bytes;
                            MOVE a one byte hex value containing the
                                length of the last partial line to
                                BUFF_PTR_NOW;
                                        /*   length for horiz. move   */
                            INCREMEMENT BUFF_PTR_NOW by 1 byte;
                         END;           /* end: max_len not == line len*/

/*   Move to position of      */
                                        /*     the end of the         */
                                        /*     defined maximum len    */
                                        /*     of the field. Cursor   */
                                        /*     will wrap if this      */
                                        /*     is not on the same     */
                                        /*     line                   */
                      MOVE PROT_ATTRIB to BUFF_PTR_NOW;
                      CURRENT_ATTRIB = PROTECTED;
                      INCREMEMENT BUFF_PTR_NOW by 3 bytes;
                      INCREMENT FIELD_NUMBER;
                      IF IF MAX_LEN
                            ( of struct pointed to by VAR_DEF_PTR )
                                does not exactly fill a whole number of
                                lines ( eg. 36 characters on the first
                                line and 80 on any subsequent lines)
                         THEN
                         DO;
                            MOVE X'250D' to BUFF_PTR_NOW;
                                        /*   Get to the start of      */
                                        /*    . the next line.        */
```

```
                    INCREMENT BUFF_PTR_NOW by 2 bytes;
                END;
            END;                    /* end: attrib = unprot-ni   */
        END;                        /* end: max_len > 0          */
      END;                          /* end: text_len = 0         */
      LINES_LEFT = LINES_LEFT - LINES_REQUIRED;
                                    /*    Deduct the number of   */
                                    /*    screen lines used from */
                                    /*    the total lines left.  */
    END;                            /*end: lines req < lines left*/
  ELSE
    DO;
      LINES_LEFT = 0;
                                    /* If the next variable      */
                                    /*    to be displayed won't  */
                                    /*    fit we effectively     */
                                    /*    have no lines left -   */
                                    /*    screen body complete   */
      FPCA_LAST_VARIABLE = VARIABLE_NUMBER - 1;
                                    /* Work out last var.        */
                                    /*    displayed.             */
      MOVE X'340401340049' TO BUFF_PTR_NOW;
                                    /* Move to line 1, col 73    */
      ADD 6 to BUFF_PTR_NOW;
      MOVE FPCA_LAST_VARIABLE to BUFF_PTR_NOW;
      ADD 2 to BUFF_PTR_NOW;
    END;
MESSAGE_POINTER = BUFF_PTR_NOW + 10;
                                    /* The message area starts   */
                                    /*    10 bytes into the      */
                                    /*    screen tail which is   */
                                    /*    about to be copied to  */
                                    /*    the buffer.            */
MOVE SCREEN_TAIL to BUFF_PTR_NOW;
ADD length of SCREEN_TAIL to BUFF_PTR now;

MOVE X'340401340001' to BUFF_PTR_NOW;
                                    /* Move to line 1, column 1  */

/**********************************************************************/
/* Forms Processor Pseudo code                                        */
/*                                                    Simon Elphick   */
/*                                                    8/18/86         */
/*                                                                    */
/* MODULE NAME: Subset of DWDF4200                                    */
/*                                                                    */
/*                                                                    */
/* FUNCTION: Merge Shell or WIP document and Variable Text            */
/*                                                                    */
/*                                                                    */
/* DESCRIPTION:                                                       */
/*                                                                    */
/*      This module is the interface to the Forms Merge microcode.    */
/* It can be invoked to perform either of the following functions:    */
/*                                                                    */
/*    1) Create                                                       */
/*                                                                    */
/*       Merge Variable Text into a copy of a Shell document.         */
/*                                                                    */
/*    2) Revise                                                       */
/*                                                                    */
/*       Remove any text that has been updated by an end user         */
/*       from a Work in Progress document and merge in the            */
/*       updated text, and any new text.                              */
/*                                                                    */
/**********************************************************************/
```

```
/************************************************************/
/*                                                          */
/*        ---------- Constants            -------------;    */
/*                                                          */
/************************************************************/

CHANGE_GCID   = X'2BD10601';              /* RFTDCA SCG control         */

/* First Non Text Unit struct */
                                          /*********                    */
NTU_STRUCT_1::
  ... NTUP1      = X'000BE108000302F10303BE'; /* RFTDCA structures      */
  ... NTU_LEN    num(2)                     ; /*    to precede first    */
  ... NTU_SEG1   = X'E80300'                ; /*         NTU            */

/* Second Non Text Unit struct */
                                          /*********                     */
NTU_STRUCT_2::
  ... NTUP2      = X'000BE108000302F20303BE'; /* RFTDCA structures      */
  ... NTU_LEN    num(2)                     ; /*    to precede the      */
  ... NTU_SEG2   = X'E80300'                ; /*    2nd       NTU       */

/* Non text segment CTF        */

NTU_END              struct:;             /* Structure to be inserted into */
 .... FPCA_SEG7_SIZE       num(2);        /*  the end of the last NTU non  */
 .... FPCA_SHELL_DEI_SIZE  num(2);        /*  text segment.                */
 .... FPCA_VAR_REPLY_SIZE  num(2);        /* Size of segment 7 required for */

.... FPCA_VRC_AREA_SIZE   num(2);        /* Revise and the areas in it.    */
 .... NTU_LEN_1            num(2);        /* Sizes of the two possible NTUs */
 .... NUM_LEN_2            num(2);        /*                                */
 .... NTU_START_REC        num(4);        /* Record and offset of the start */
 .... NTU_REC_OFFSET       num(2);        /*  of the NTU                    */
 .... FPCA_INFORMATION     char(16);      /* WIP Information field          */
 .... NTU_END = X'C6D6E2E240D5E3E4';      /* eye-catcher: "FOSSNTU"         */
 .... RFTDCA_END = X'0005E1C6000006E807000C';
                                          /* RFTDCA end sequence:           */
                                          /*   End Unit Prefix              */
                                          /*   Body Text                    */
                                          /*   Page End                     */

/************************************************************************/
/* For performance reasons we want to avoid processing the entire        */
/* document dataset to get to the NTU during Revise. The process         */
/* will be to extract the last document record which will end with       */
/* the structure above. If the NTU does not start on that record         */
/* the return value from writing the record it started on out will       */
/* be in NTU_START_REC. This value was from:                             */
/*                                                                       */
/*        rmi_ptr -> fdr.fnr_rtype.fmruu_return                          */
/*                                                                       */
/* NTU_REC_OFFSET is the offset within that record of the start.         */
/*                                                                       */
/************************************************************************/

/************************************************************************/
/*                                                                      */
/* The Non Text Unit Structures constructed are as follows:             */
/*                                                                      */
/*   NONTEXT UNIT PREFIX  ----------------------------------------      */
/*                                                                      */
/*     LL                          11                                   */
/*     CTF                         X'E10800'                            */
/*     NonText Unit Name                                                */
```

```
/*          Length                    3                                   */
/*          Type                      X'02'                               */
/*          Name                      X'F1' - X'F2' -- number of the      */
/*                                                     NTU                */
/*     Object Source Type                                                 */
/*          Length                    3                                   */
/*          Type                      X'03'                               */
/*          Source Type               X'3E' (          NTU)               */
/*                                                                        */
/*   NOMTEXT UNIT SEGMENT  ---------------------------------------        */
/*          LL                        X'0006'-X'7FFF'                     */
/*          CTF                       X'E80800'                           */
/*          Object Source             1-32762 bytes of FPCA, Shell        */
/*                                       Detail area, Variable Reply      */
/*                                       area, and Variable Reply         */
/*                                       Overflow area, followed by       */
/*                                       an NTU_END structure as the      */
/*                                       last thing in the document.      */
/*                                                                        */
/*  The maximum number of NTU's that may be required in a WIP             */
/*     document is 2, since the maximum amount of data to be saved        */
/*     fits into a 64K segment.                                           */
/*                                                                        */
/*************************************************************************/

/*************************************************************************/
/*                                                                        */
/*           ----------- Start of code              -----------;          */
/*                                                                        */
/*************************************************************************/

IF (90) IF BATCH_MERGE calling parameter = YES
THEN
DO;
    FPCA_PTR = Pointer returned by CALLOC for size of FPCA;
                                       /* FPCA is fixed size struct  */
                                       /*  get storage for it.       */
    READ the Forms Batch workstation "next in, next out"
        dataset;

READ the "next out" record from the queue dataset into the
        FPCA CALLOCED area;
END;

READ File Cabinet of FPCA_USERID, key = FPCA_WIP_NAME into
    FILE_CAB_PTR;
                                       /* Read the File Cabinet      */
                                       /*  record of the Work in     */
                                       /*  Progress document into the*/
                                       /*  File Cabinet Record struct.*/

Initialise fields in MICROCODE_STRUCT not already set;

DO DO WHILE MERGE_FINISHED = NO;
                                       /* Loop calling the merge     */
                                       /*  microcode until the merge */
                                       /*  is finished, good or bad. */

CALL FCL - Issue FPMERGE instruction - pass pointer to parameters;
```

```
IF (90) IF FPCA_RETURN after microcode routine = OK
THEN
DO;
                                         /* Document has been merged    */
                                         /*   succesfully               */

DO DO WHILE DATA_IN_OUT_BUFF > 1024;
         WRITE 1024 byte record to the output document dataset from
             START_OUT_BUFF_PTR;
       DATA_IN_OUT_BUFF = DATA_IN_OUT_BUFF - 1024;
       START_OUT_BUFF_PTR = OUTPUT_BUFF_PTR + 1024;
     END;

IF (90) IF DATA_IN_OUT_BUFFER > 0
   THEN
   DO;
                                     /* Buffer not empty -          */
                                     /*  write the last data from   */
                                     /*  the buffer to the output   */
                                     /*  document dataset.          */
       WRITE record to the output document dataset from
             START_OUT_BUFF_PTR, length = DATA_IN_OUT_BUFFER;
   END;

Clear out the output buffer;
   Clear out the input buffer;
                                     /* Clear out the buffers, reset*/
                                     /*  pointers.                  */

Clear out remainder of the input document;
                                     /* If the input document is    */
                                     /*  not empty we want to       */
                                     /*  read a record at a time    */
                                     /*  into the input buffer and  */
                                     /*  write it straight out to   */
                                     /*  the output document        */
                                     /*  dataset.                   */

Copy the area lengths from the FPCA to the NTU_END struct;
   Calculate the size of the data to be written to the Non Text
    Unit:;

NTU_DATA_SIZE = FPCA_SHELL_DEI_SIZE +
                     FPCA_VAR_REPLY_SIZE +
                     FPCA_VRO_AREA_SIZE +
                         ( NTU_END structure size - RFTDCA_END );

IF IF NTU_DATA_SIZE < 32K
   THEN
   DO;
       NTU_LEN_1 = NTU_DATA_SIZE;
                                     /* Write the size of the data  */
                                     /*  to be included in the NTU  */
                                     /*  into the NTU structure.    */

NTU_LEN_2 = 0;

Write the NTU_1_STRUCT to the output document

Store the value returned writing the last record out in the
             NTU_START_REC field, 0 in the NTU_REC_OFFSET field;

WRITE the data in Segment 7 to the output document dataset,
             in 1024 byte records as far as possible,
```

```
                           starting with the Shell Detail area;

Write the NTU_END structure to the output document dataset

END;                              /* end: ntu data size < 32K      */
    /*                                                                 */

/*******************************************************************/
/*                                              Simon Elphick       */
/*                                              8/21/86             */
/*                                                                  */
/* MODULE NAME: Subset of FPMERGE                                   */
/*                                                                  */
/* FUNCTION: Microcode Merge RFTDCA Shell document and Variable text*/
/*                                                                  */
/* DESCRIPTION:                                                     */
/*                                                                  */
/*       This module performs the merge of the Variable             */
/* Text and the RFTDCA document data stream. The module performs    */
/* the merge for both Create and Revise.                            */
/*                                                                  */
/*******************************************************************/

IF (40) IF VAR_OFFSET > INPUT_BUFF_DOC_STOP
    THEN
    DO;
                                        /* Variable offset is in strge */

IF IF
         (OUTPUT_BUFFER_END - (START_OUT_BUFF_PTR + DATA_IN_OUT_BUFF))
            > DATA_IN_IN_BUFFER
      THEN
      DO;
                                        /* There's enough room in the  */
                                        /*  output buffer for the whole*/
                                        /*  move.                      */
         MOVE from START_IN_BUFFER_PTR to START_OUT_BUFF_PTR for length
             ( VAR_OFFSET -INPUT_BUFF_DOC_START );
                                        /* Move text preceding the     */
                                        /* Variable location from the  */
                                        /* input buffer to the output  */
                                        /* buffer.                     */

IF IF the DUPLICATE field for the current Variable is
             not equal to 0
         THEN
         DO;
            Set SDD_ENTRY_PTR to SDD entry of variable in DUPLICATE;
            SET DUPLICATE_FLAG = YES;
                                        /* If this Variable is a duplicate, */
                                        /*  the text to be inserted here is */
                                        /*  in the Variable Reply entry for */
                                        /*  the Variable number in the      */
                                        /*  Duplicate field. The DUPLICATE  */
                                        /*  field contains the Variable     */
                                        /*  number of the first occurrence  */
                                        /*  of this Variable name in the    */
                                        /*  Shell. Set pointer to it's SDD  */
                                        /*  entry                           */

IF (70) IF ( OUTPUT_BUFFER_END - START_OUT_BUFF_PTR )
                > TEXT_TO_BE_INCLUDED
    THEN
    DO;
                                        /* If there is room in the  */
                                        /*  output buffer for the   */
```

```
                                    /*   data up to the current    */
                                    /*   Variable offset then       */
                                    /*   move Variable text and     */
                                    /*   controls to o/p buffer.    */
    IF IF TEXT_GCID is not equal to CURRENT_GCID
    THEN
    DO;
       MOVE  CHANGE_GCID to (START_OUT_BUFF_PTR+DATA_IN_OUT_BUFF);
       MOVE TEXT_GCID to START_OUT_BUFFER_PTR + DATA_IN_OUT_BUFF;
       MOVE text to START_OUT_BUFF_PTR + DATA_IN_OUT_BUFF;
       MOVE  CHANGE_GCID to START_OUT_BUFF_PTR + DATA_IN_OUT_BUFF;
       MOVE CURRENT_GCID to START_OUT_BUFFER_PTR + DATA_IN_OUT_BUFF;
                                    /*                              */
                                    /* If the GCID of the text to   */
                                    /*   be added is not the same   */
                                    /*   the current GCID, move     */
                                    /*   the text to the output     */
                                    /*   buffer preceded and followd*/
                                    /*   by "change GCID" controls. */
                                    /*                              */
    END;                            /*endif:text gcid ne curr_gcid */
    ELSE
    DO;
                                    /* else: text is same gcid as   */
                                    /*   shell.                     */

MOVE text to START_OUT_BUFF_PTR + DATA_IN_OUT_BUFF;
    END;
END;                                /* end: room for var text       */

IF (90) IF FPCA_REVISE = YES
THEN
DO;
   START_IN_DOC_PTR = START_IN_DOC_PTR +
        MERGED_TEXT_LEN ( from SDD entry );
                                    /*                              */
                                    /*  If we are revising then     */
                                    /*    move the input pointer    */
                                    /*    beyond the length of the  */
                                    /*    text and controls that    */
                                    /*    are being replaced.       */
END;                                /* end: function is revise      */
                                    /*                              */

Increment SDD_ENTRY_PTR;            /*                              */
                                    /* Move to the next Variable    */
/********************************************************************/
/*                                                  Simon Elphick   */
/*                                                  8/29/86         */
/* MODULE NAME: Subset of DWDF6000                                   */
/*                                                                   */
/* FUNCTION: Revise a Work in process Document                       */
/*                                                                   */
/* DESCRIPTION:                                                      */
/*                                                                   */
/*         This module enables the user to modify the variable      */
/* text in a Work in Process document created by the Forms Processor.*/
/* Only the Variable text may be modified. The standard text of the  */
/* Shell cannot be modified by this system.                          */
/*                                                                   */
/*         All the information required to perform the merge is     */
/* contained within the Non Text Unit at the end of the WIP document.*/
/* If the NTU does not exist because the document is not a    WIP   */
/* document, or the NTU has been deleted through editing of the      */
/* document on another product then the document cannot be revised.  */
/* If the document was a WIP document but has been Commited then     */
/* the document is also non-revisable on this system.                */
/********************************************************************/
```

```
Open the WIP document dataset and read the entire contents into
   storage;

Set the pointer to the NTU_END struct to the byte beyond the
   last data read into the buffer;
                            /* Set a pointer to the end of the   */
                            /* document dataset                  */
Decrement the pointer;
                            /* The pointer should now point to   */
                            /* the position one structure-length */
                            /* from the end of the document.     */
                            /*                                   */
                            /* If this is a        WIP document  */
                            /* it will be pointing to the        */
                            /* length of the data in the NTU     */
                            /*                                   */

IF IF data in the eyecatcher position is not a        eyecatcher
THEN
DO;
   Set FPCA_RETURN = DOCUMENT_NOT_WIP;
   Free CALLOCed storage
   Return to DWDP5000;
                            /* This document is not reviseable   */
                            /* by       . Exit.                  */
END;
ELSE
DO;

Go to start of the NTU;
                            /* Starting position of the NTU is   */
                            /* recorded in the end structure     */
   IF IF NTU does not start with the sequence '000BE10B000302F10303BE'
      or '000BE10B000302F20303BE'
   THEN
   DO;
      Set FPCA_RETURN = DOCUMENT_NOT_WIP;
      Free CALLOCed storage
      Return to DWDP5000;
   END;
                            /* NTU has been corrupted. Exit      */
END;

Read the NTU from the input document;
                            /* The NTU_END structure and the     */
                            /*   Non Text Segment structured     */
                            /*   field at the start should not   */
                            /*   be read in. The Shell Detail    */
                            /*   dataset contents and the        */
                            /*   Variable Reply dataset contents */
                            /*   should be.                      */
                            /*                                   */
                            /* If there are two NTU's the NTUP   */
                            /*   and NTUS RFTDCA strcutured fields*/
                            /*   should be stripped off both.    */

CALL DWDP4100 - Review the Variables;
                            /* Call module to display the        */
                            /* Variable text for review          */
```

What is claimed is:

1. The method of preparing a structured document in a network of computer controlled keyboard displays comprising the steps of:

displaying to an operator, from shell detail data, prompt messages to said operator which solicit entry of variable text to be merged into a related shell document which has been selected by an operator;

reading from said keyboard, said variable text entered by said operator in response to said prompt messages;

establishing in the memory of the computer controlling said display to said operator, variable reply data containing said variable text entered by said operator;

concatenating said variable reply data and said shell detail data to said shell document to create a work in progress document, said shell document being separated from said shell detail data and said variable reply data by a non text unit identifier;

transmitting said work in progress document to another computer in said network;

displaying to another person at said another computer from said shell detail data and from said variable reply data of said work in progress document, said prompt messages and said variable text entered by said operator;

reading from said keyboard at said another computer, revised variable text entered by said another person in response to said prompt messages and said variable text entered by said operator;

replacing variable text in said variable reply data with said revised variable text; and merging said revised variable text from said variable reply data into said shell document to create a merged document which contains the invariable text of said shell document and said variable text and said revised variable text to provide said structured document.

2. The method of claim 1 wherein said step of concatenating first includes the step of:

merging said variable text from said variable reply data into said shell document to create a merged portion which contains said invariable text of said shell document and said variable text to provide a merged portion to which said variable reply data and said shell detail data are concatenated instead of said shell document to create said work in progress document.

3. The method of creating a work in progress document comprising the steps of:

responding to the selection by an operator, at a computer controlled keyboard display work station, of a shell document by displaying to said operator, prompt messages from shell detail data, said prompt messages soliciting entry of variable text to be merged into said shell document which has been selected by said operator and reading from said keyboard of said work station, said variable text entered by said operator in response to said prompt messages;

establishing in the memory of said computer, variable reply data containing said variable text entered by said operator;

concatenating said variable reply data and said shell detail data to said shell document, by inserting an identifier between said shell document and said data, to create said work in progress document which can be sent to another computer for revision.

4. The method of revising a work in progress document stored in the memory of a computer controlled keyboard display workstation comprising the steps of:

displaying to a person at said computer, prompt messages from shell detail data and variable text from variable reply data, said variable text having been previously entered by another person who created said work in progress document, said shell detail data and said variable reply data being part of said work in progress document and separated from invariable text by a control indicator;

reading from said keyboard at said computer, revised variable text entered by said person in response to said prompt messages and said variable text entered by said another person;

replacing variable text in said variable reply data with said revised variable text; and merging said revised variable text from said variable reply data into said invariable text which is also part of said work in progress document to create a merged document which contains said invariable text, at least some of said variable text and said revised variable text.

5. The method of editing a structured document received from another computer, said structured document being a combination of fixed text and variable text, comprising the steps of:

separating said variable text from said fixed text by recognizing a control indicator;

displaying said variable text to a person editing said structured document;

replacing text in said variable text portion of said structured document with revised text received from said person editing said structured document to create revised variable text;

merging said revised variable text and said fixed text to provide an integrated document in which said fixed text and said revised variable text are no longer separately distinguishable.

* * * * *